April 1, 1969  D. B. HORTON ET AL  3,435,846
TANK FITTINGS
Filed Aug. 1, 1966
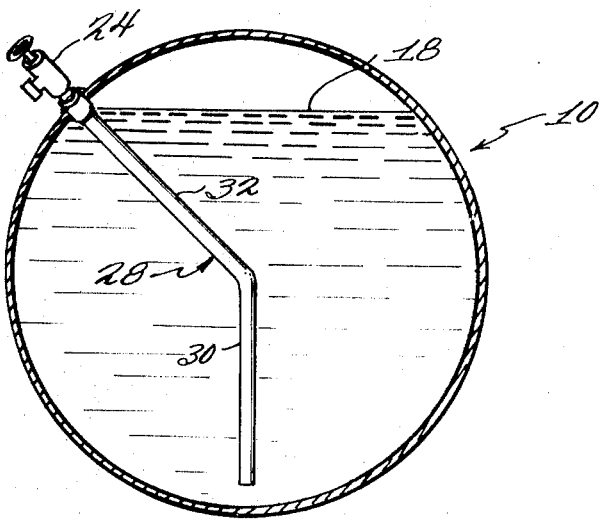
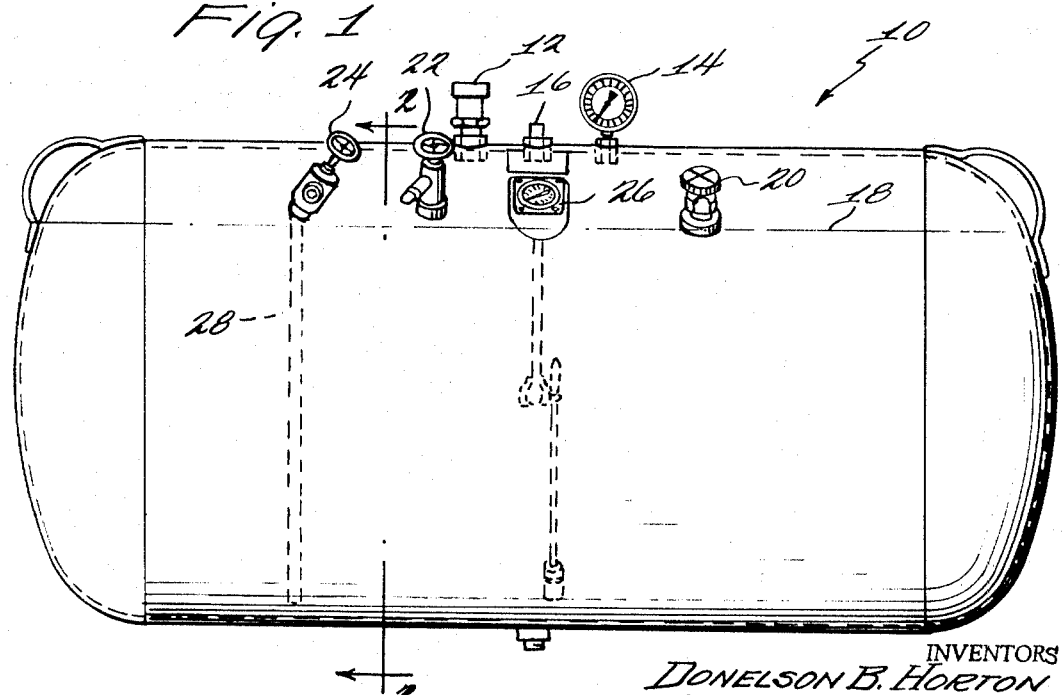
INVENTORS
DONELSON B. HORTON
EUGENE C. CAGLE
BY *Cushman, Darby & Cushman*
ATTORNEYS s
United States Patent Office 3,435,846
Patented Apr. 1, 1969

3,435,846
TANK FITTINGS
Donelson B. Horton, Madison, and Eugene C. Cagle, Huntsville, Ala., assignors to John Blue Company, Incorporated, Huntsville, Ala., a corporation of Alabama
Filed Aug. 1, 1966, Ser. No. 569,247
Int. Cl. F17b 1/00; E03b 11/00
U.S. Cl. 137—590                                    1 Claim

ABSTRACT OF THE DISCLOSURE

A substantially cylindrical storage tank positioned with its longitudinal axis extending horizontally and having fixtures mounted on the tank exterior along a line generally corresponding to the tank's 85 percent full level. One of the fixtures is a liquid outlet valve connected to an eduction tube within the tank. The tube has a vertical portion extending upwardly from the tank bottom to an inclined portion joined with the outlet valve.

---

The present invention relates to tank fittings on the exterior of a liquid storage tank, and more particularly, to an improved arrangement for positioning the tank fittings at a location which is accessible to the operator.

On a typical pressurized storage tank for holding liquids, such as anhydrous ammonia, the various exterior fittings of the tank are positioned at the top thereof. With the trend toward larger diameter tanks, the fittings installed on the tank top are becoming increasingly inaccessible and require that the operator climb onto the tank to operate the fittings. This results not only in inconvenience to the operator, but also generates a safety problem.

A prior attempt to overcome these problems has been to mount the fittings at the end of the tank. However, this requires either costly recessed fittings or a bulky guard to protect the fittings from injury, particularly during installation.

It is therefore a principal object of the present invention to provide an improved fitting arrangement for a storage tank which is readily accessible to an operator.

Another object of the invention is to provide an economical tank fitting arrangement which is not located in an exposed position where it is likely to be damaged during installation of the tank or during service.

Further objects and the entire scope of the invention will become more fully apparent when considered in light of the following detailed description of an illustrative embodiment of the invention and from the appended claims.

The illustrative embodiment may be best understood by reference to the accompanying drawings, wherein:

FIGURE 1 is a side elevation view of a typical tank structure incorporating the improved tank fitting arrangement; and FIGURE 2 is a cross-sectional view of the tank taken along line 2—2 of FIGURE 1.

Throughout the industry, the storage of liquids under pressure, such an anhydrous ammonia, is regulated so that filling the tank beyond the 85 percent level is prohibited. In the present invention, this fact is utilized in that the exterior fittings to be actuated by the operator are mounted on the 85 percent liquid level line. Consequently, the fittings are readily accessible to the operator standing on the ground, and yet, since they are located above the center of tank, the fittings are in an area where they are not likely to be damaged during installation and service.

Referring now to the drawings, the invention will be described in detail. In FIGURE 1 there is illustrated a conventional, substantially cylindrical liquid storage tank, indicated generally as 10. This tank, positioned with its longitudinal axis extending horizontally, is suitable for the pressurized storage of liquids, such as anhydrous ammonia. A safety relief valve 12 and a pressure gauge 14 are mounted on the top of the tank 10. A plug 16 is also positioned at the top of the tank to close an opening for a vapor return valve, if one is needed. Along the side of the tank 10, at substantially the 85 percent liquid level line which is indicated as 18, the operator actuated fittings are located. These include the filler valve 20 for the liquid, the 85% volume gauge and gas exhaust valve 22, and the liquid outlet valve 24. The liquid level gauge 26 is also mounted on the side of the tank 10 at substantially the 85 percent liquid level line.

Valves 20, 22 and 24 are conventional in construction, as is the liquid level gauge 26. Therefore, they need not be further discussed in detail except to describe the arrangement by which the liquid outlet valve is joined to the eduction tube 28 through which the liquid is discharged from the tank 10. The details of this arrangement can best be illustrated by reference to FIGURE 2 wherein tube 28 is illustrated as comprising a lower vertical portion 30 extending from the bottom of tank 10 upwardly to an inclined portion 32 which is oriented at an angle of between 90° and 180° to portion 30, the exact angle depending on the diameter of tank 10, so as to join with valve 24 at substantially the 85 percent liquid level line 18.

From the foregoing it is apparent that the operator actuated fittings 20, 22 and 24, together with the liquid level gauge 26, by being positioned on substantially the 85 percent liquid level line, are vertically and horizontally closer to the operator than in the case of conventional fitting arrangements where the fittings are on the top of the tank. Consequently, the operator can reach the fittings without climbing onto the tank. Also, since the fittings are above the widest part of the tank, they are relatively free of the danger of damage during installation and service. These advantages are achieved without costly changes in conventional tank design and fabrication.

What is claimed is:
1. An improved arrangement for tank fittings comprising: substantially cylindrical storage tank for liquids, said tank being positioned with its longitudinal axis extending horizontally; a plurality of tank fittings mounted on the exterior of said tank along a line which substantially corresponds to that defined by the level of the liquid when said tank is 85 percent filled, said plurality of fittings including a liquid outlet valve; an eduction tube within said tank which is connected to said outlet valve, said tube comprising a lower vertical portion extending upwardly from the bottom of said tank and an inclined portion oriented with respect to the vertical portion at an angle between 90° and 180° to connect said vertical tube portion to the outlet valve.

References Cited

UNITED STATES PATENTS

| 593,115 | 11/1897 | Normand et al. | 137—206 |
| 1,450,934 | 4/1923 | Wilson | 137—206 |

M. CARY NELSON, *Primary Examiner.*

W. R. CLINE, *Assistant Examiner.*